United States Patent [19]

Belsan et al.

[11] Patent Number: 5,379,391

[45] Date of Patent: Jan. 3, 1995

[54] METHOD AND APPARATUS TO ACCESS DATA RECORDS IN A CACHE MEMORY BY MULTIPLE VIRTUAL ADDRESSES

[75] Inventors: Jay S. Belsan, Nederland; John T. O'Brien, Louisville, both of Colo.

[73] Assignee: Storage Technology Corporation, Louisville, Colo.

[21] Appl. No.: 663,099

[22] Filed: Mar. 1, 1991

[51] Int. Cl.⁶ .............. G06F 12/00; G06F 12/16; G06F 13/00

[52] U.S. Cl. .............. 395/400; 395/425; 364/243; 364/243.4; 364/243.41; 364/253; 364/256.3; 364/DIG. 1

[58] Field of Search .............. 395/425, 650, 275, 525, 395/400

[56] References Cited

U.S. PATENT DOCUMENTS

| | | | |
|---|---|---|---|
| 4,577,274 | 3/1986 | Ho et al. | 395/425 |
| 4,742,447 | 5/1988 | Duvall et al. | 395/275 |
| 4,742,450 | 5/1988 | Duvall et al. | 395/700 |
| 4,761,737 | 8/1988 | Duvall et al. | 395/400 |
| 4,814,971 | 3/1989 | Thatte | 395/600 |
| 4,956,771 | 9/1990 | Nenstaedter | 395/650 |
| 5,123,101 | 6/1992 | Sindhu | 395/400 |
| 5,163,148 | 11/1992 | Walls | 395/600 |
| 5,182,805 | 1/1993 | Campbell | 395/650 |

Primary Examiner—Jack B. Harvey
Assistant Examiner—Michael A. Whitfield
Attorney, Agent, or Firm—Duft, Graziano & Forest

[57] ABSTRACT

The data record copy apparatus for a virtual memory system instantaneously makes a copy of a selected data record by simply generating a new set of pointers to reference the same physical memory location as the original reference pointer. All the pointers referencing the same physical memory space are stored in the virtual memory mapping tables to record all the virtual addresses of the data record. When the original data record is staged to an associated cache memory or a copy of the data record is in cache memory, the consistency of the data record is maintained by loading all the virtual addresses of the data record from the mapping tables to the hash table and collision list of the cache memory. Thus, any access of one of these virtual addresses will result in the virtual memory system locating the single data record instance in cache memory. If an associated host processor attempts to update the data record at one of these virtual addresses, the virtual memory system copies the data record to a new cache memory location so that a unique instance of the data record is available for update while the remaining virtual addresses still point to the original data record in cache memory.

8 Claims, 6 Drawing Sheets

METHOD AND APPARATUS TO ACCESS DATA RECORDS IN A CACHE MEMORY BY MULTIPLE VIRTUAL ADDRESSES

CROSS REFERENCE TO RELATED APPLICATIONS

This patent-application is related to application Ser. No. 07/443,933, now abandoned, entitled "Data Record Copy Apparatus for a Virtual Memory System," filed on 30 Nov. 1989 and application Ser. No. 07/509,484 now U.S. Pat. No. 5,124,587, entitled "Logical Track Write Scheduling System For A Parallel Disk Drive Array Data Storage Subsystem", filed on 16 Apr. 1990.

FIELD OF THE INVENTION

This apparatus relates to virtual memory systems and, in particular, to a data record copy apparatus in a disk drive array that instantly makes a copy of an existing data record without having to read the data record from memory and with cache consistency protection for these two data records.

PROBLEM

It is a problem in the field of memory systems to expeditiously manage copies of data records stored therein. In non-dynamically mapped data storage subsystems, when the host processor accesses a data record that has been copied to multiple locations, there is no way of knowing that the data record in those locations is identical. As a result, when the host processor attempts to read a data record that is actually identical to a data record already stored in cache, but located at some other virtual address, the copy of the data record is restaged into another cache memory location. This takes time for the staging and takes up valuable cache space unnecessarily, and reduces the cache hit ratio. Both of these actions adversely affect the performance of the data storage subsystem.

The data record copy apparatus disclosed in the patent application Ser. No. 07/443,933, entitled Data Record Copy Apparatus for a Virtual Memory System, filed on 30 Nov. 1989, instantaneously makes a copy of a selected data record by simply generating a new set of pointers to reference the same physical memory location as the original set of reference pointers. This apparatus effectively makes a copy of the data record by simply generating a second set of pointers referencing the same physical memory space.

Two different programs can thereby each access identical copies of the data record since the data record is a single physical entity. This apparatus instantaneously makes available a copy of the original data record without the time penalty of having to download the data record to the processor and write a copy of the data record to a new physical memory location. For the purpose of enabling a program to simply access the data record at a different memory address, the use of this mechanism provides a significant time advantage.

A difficulty encountered with this arrangement in disk drive array virtual memory systems is that a cache memory is interposed between the disk drive memory and the host processors. Every data record that is read, modified, or newly created, is temporarily stored in the cache memory until it can be written to the backend disk drive data storage elements. Therefore, when a copy is made of a data record by simply generating a new memory pointer, there is no actual second data record in the cache memory, simply a new pointer. The original data record stored in the cache memory can be modified before the original data record is stored on a disk drive data storage element. Therefore, there is the possibility of a loss of data record integrity since the two pointers and the actual data record may be subject to change and the cache memory will then not contain an accurate representation of the two distinct data records.

SOLUTION

The above described problems are solved and a technical advance achieved in the field by the method and apparatus to access data records in a cache memory by multiple virtual addresses. The data storage subsystem includes a data record copy apparatus which instantaneously makes a copy of a selected data record by simply generating a new set of pointers to reference the same physical memory location as the original set of reference pointers. Thus, by simply generating a second set of pointers referencing the same physical memory space, this apparatus effectively makes a copy of the data record. Two different programs can thereby each access identical copies of the data record since the data record is a single physical entity.

The data record access control apparatus of this data storage subsystem prevents the original data record or a copy thereof stored in cache memory from being modified without a loss of data consistency by managing all the memory pointers. All the pointers referencing the same physical memory space are stored in the virtual memory mapping tables to record all the virtual addresses of the data record. When the original data record is staged to an associated cache memory or a copy of the data record is in cache memory, the consistency of the data record is maintained by loading all the virtual addresses of the data record from the mapping tables to the hash table and collision list of the cache memory. Thus, any access of one of these virtual addresses will result in the virtual memory system locating the single data record instance. If an associated host processor attempts to update the data record at one of these virtual addresses, the virtual memory system copies the data record to a new cache memory location so that a unique instance of the data record is available for update while the remaining virtual addresses still point to the original data record in cache memory.

DETAILED DESCRIPTION

The data storage subsystem includes a data record copy apparatus for a virtual memory system which instantaneously makes a copy of a selected data record by simply generating a new set of pointers to reference the same physical memory location as the original set of reference pointers. Thus, by simply generating a second set of pointers referencing the same physical memory space, this apparatus effectively makes a copy of the data record. Two different programs can thereby each access identical copies of the data record since the data record is a single physical entity.

The data record access control apparatus of the data storage subsystem prevents the original data record stored in cache memory from being modified without a loss of data consistency by managing all the memory pointers. All the pointers referencing the same physical memory space are stored in the virtual memory mapping tables to record all the virtual addresses of the data record. When the original data record is staged to an associated cache memory or a copy of the data record is in cache memory, the consistency of the data record is maintained by loading all the virtual addresses of the data record from the mapping tables to the hash table and collision list of the cache memory. Thus, any access of one of these virtual addresses will result in the virtual memory system locating the single data record instance. If an associated host processor attempts to update the data record at one of these virtual addresses, the virtual memory system copies the data record to a new cache memory location so that a unique instance of the data record is available for update while the remaining virtual addresses still point to the original data record in cache memory.

Data Storage Subsystem Architecture

Figure 1:
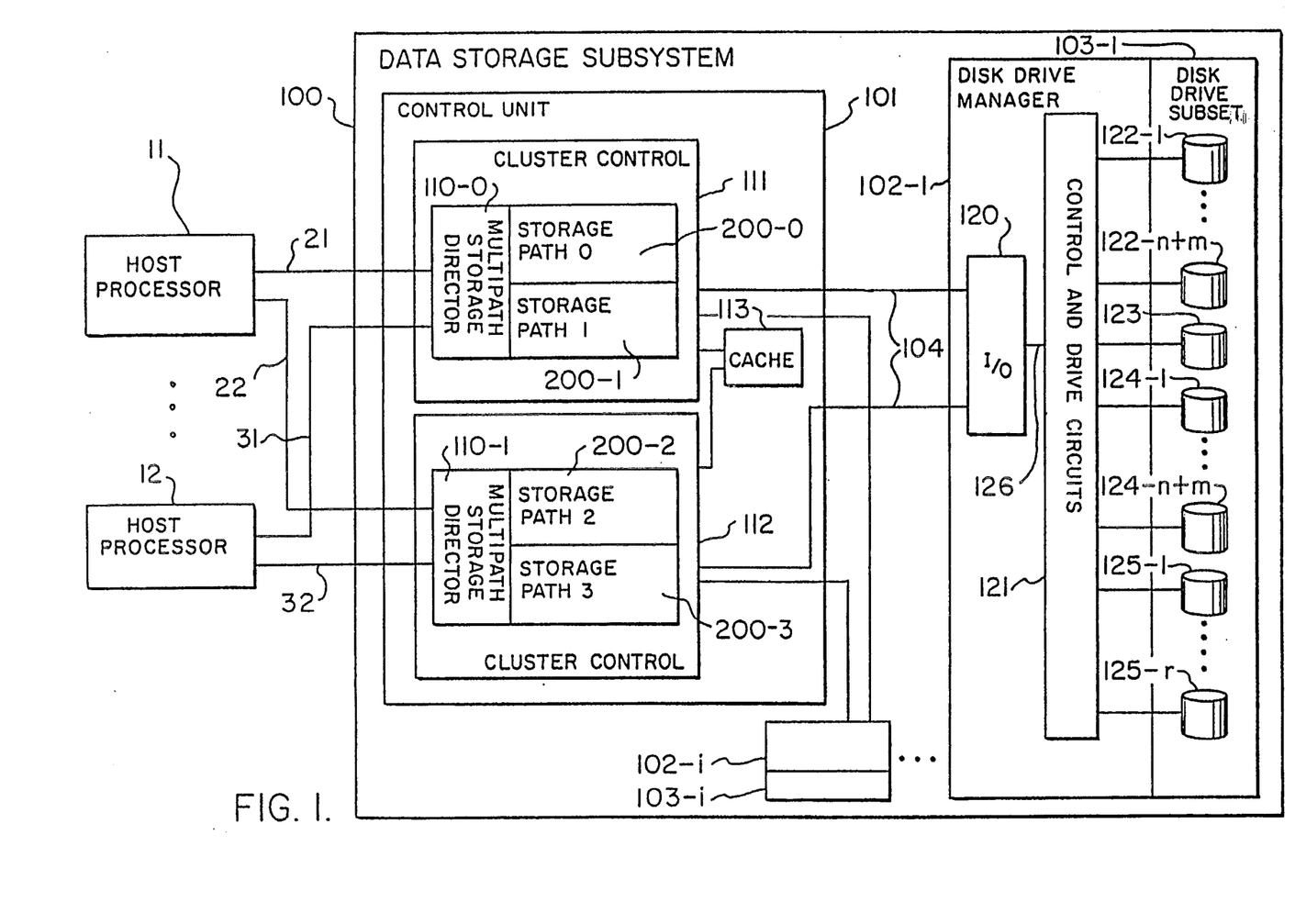
FIG. 1 illustrates in block diagram form the architecture of the disk drive array data storage subsystem.

FIG. 1 illustrates in block diagram form the architecture of the preferred embodiment of the disk drive array data storage subsystem 100. The disk drive array data storage subsystem 100 appears to the associated host processors 11-12 to be a collection of large form factor disk drives with their associated storage control, since the architecture of disk drive array data storage subsystem 100 is transparent to the associated host processors 11-12. This disk drive array data storage subsystem 100 includes a plurality of disk drives (ex 122-1 to 125-r) located in a plurality of disk drive subsets 103-1 to 103-i. The disk drives 122-1 to 125-r are significantly less expensive, even while providing disk drives to store redundancy information and providing disk drives for backup purposes, than the typical 14 inch form factor disk drive with an associated backup disk drive. The plurality of disk drives 122-1 to 125-r are typically the commodity hard disk drives in the 5¼ inch form factor, although they can also be disk drive arrays or disk drives of other than a ¼ inch form factor.

The architecture illustrated in FIG. 1 is that of a plurality of host processors 11-12 interconnected via the respective plurality of data channels 21, 22-31, 32, respectively to a data storage subsystem 100 that provides the backend data storage capacity for the host processors 11-12. This basic configuration is well known in the data processing art. The data storage subsystem 100 includes a control unit 101 that serves to interconnect the subsets of disk drives 103-1 to 103-i and their associated drive managers 102-1 to 102-i with the data channels 21-22, 31-32 that interconnect data storage subsystem 100 with the plurality of host processors 11, 12.

Control unit 101 includes typically two cluster controls 111, 112 for redundancy purposes. Within a cluster control 111 the multipath storage director 110-0 provides a hardware interface to interconnect data channels 21, 31 to cluster control 111 contained in control unit 101. In this respect, the multipath storage director 110-0 provides a hardware interface to the associated data channels 21, 31 and provides a multiplex function to enable any attached data channel ex-21 from any host processor ex-11 to interconnect to a selected cluster control 111 within control unit 101. The cluster control 111 itself provides a pair of storage paths 201-0, 201-1 which function as an interface to a plurality of optical fiber backend channels 104. In addition, the cluster control 111 includes a data compression function as well as a data routing function that enables cluster control 111 to direct the transfer of data between a selected data channel 21 and cache memory 113, and between cache memory 113 and one of the connected optical fiber backend channels 104. Control unit 101 provides the major data storage subsystem control functions that include the creation and regulation of data redundancy groups, reconstruction of data for a failed disk drive, switching a spare disk drive in place of a failed disk drive, data redundancy generation, logical device space management, and virtual to logical device mapping as is known in the field of disk drive array data storage subsystems.

Disk drive manager 102-1 interconnects the plurality of commodity disk drives 122-1 to 125-r included in disk drive subset 103-1 with the plurality of optical fiber backend channels 104. Disk drive manager 102-1 includes an input/output circuit 120 that provides a hardware interface to interconnect the optical fiber backend channels 104 with the data paths 126 that serve control and drive circuits 121. Control and drive circuits 121 receive the data on conductors 126 from input/output circuit 120 and convert the form and format of these signals as required by the associated commodity disk drives in disk drive subset 103-1. In addition, control and drive circuits 121 provide a control signalling interface to transfer signals between the disk drive subset 103-1 and control unit 101. The data that is written onto the disk drives in disk drive subset 103-1 consists of data that is transmitted from an associated host processor 11 over data channel 21 to one of cluster controls 111, 112 in control unit 101. The data is written into, for example, cluster control 111 which stores the data in cache 113. Cluster control 111 stores N physical tracks of data in cache 113 and then generates M redundancy segments for error correction purposes. Cluster control 111 then selects a subset of disk drives (122-1 to 122-n+m) to form a redundancy group to store the received data. Cluster control 111 selects an empty logical track, consisting of N+M physical tracks, in the selected redundancy group. Each of the N physical tracks of the data are written onto one of N disk drives in the selected data redundancy group. An additional M disk drives are used in the redundancy group to store the M redundancy segments. The M redundancy segments include error correction characters and data that can be used to verify the integrity of the N physical tracks that are stored on the N disk drives as well as to reconstruct one or more of the N physical tracks of the data if that physical track were lost due to a failure of the disk drive on which that physical track is stored.

Thus, data storage subsystem 100 can emulate one or more large form factor disk drives (ex—an IBM 3380K type of disk drive) using a plurality of smaller form factor disk drives while providing a high reliability capability by writing the data across a plurality of the smaller form factor disk drives. A reliability improvement is also obtained by providing a pool of R backup disk drives (125-1 to 125-r) that are switchably interconnectable in place of a failed disk drive. Data reconstruction is accomplished by the use of the M redundancy segments, so that the data stored on the remaining functioning disk drives combined with the redundancy information stored in the redundancy segments can be used by control software in control unit 101 to reconstruct the data lost when one or more of the plurality of disk drives in the redundancy group fails (122-1 to 122-n+m). This arrangement provides a reliability capability similar to that obtained by disk shadowing arrangements at a significantly reduced cost over such an arrangement.

Control Unit

Figure 4:
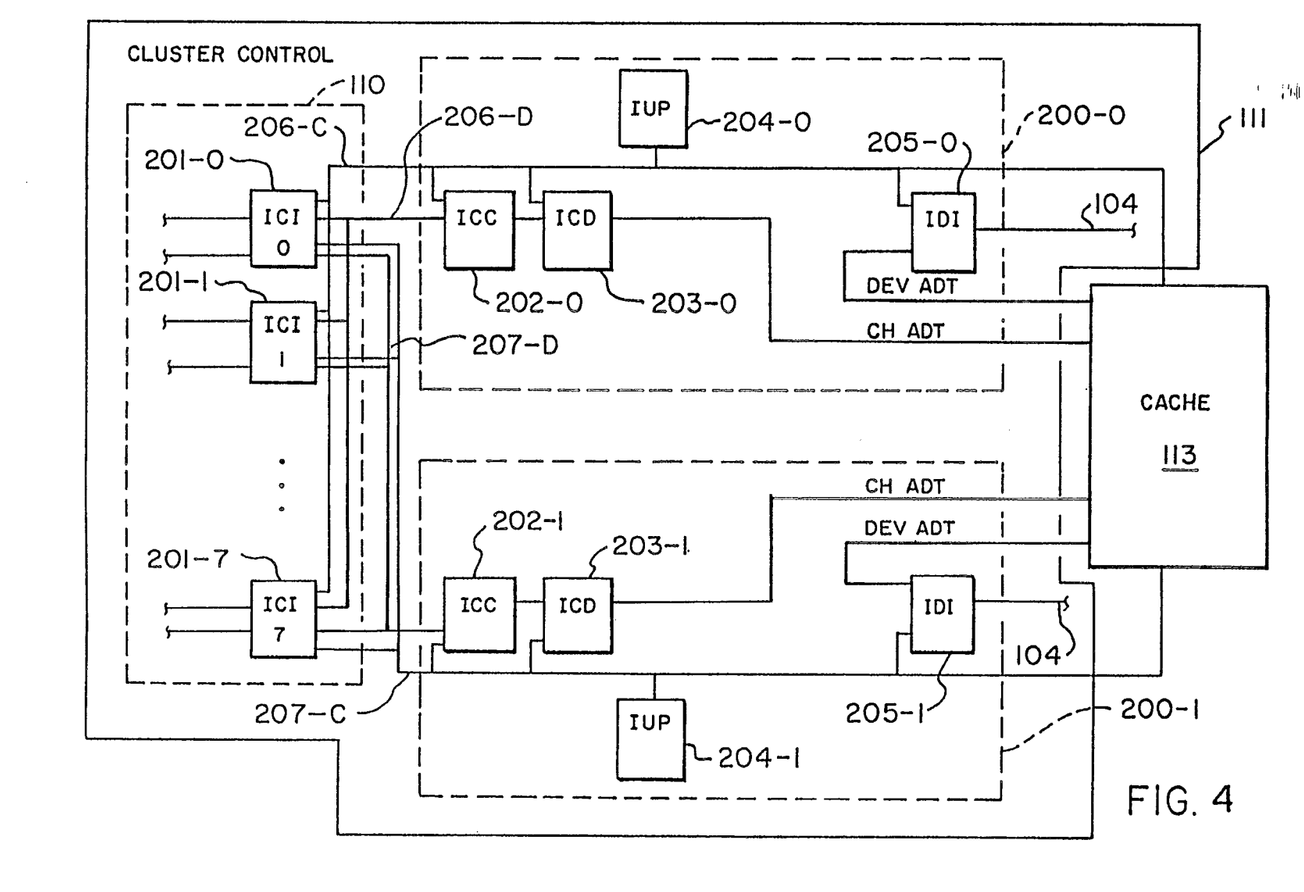
FIG. 4 illustrates in block diagram form additional details of the control unit of the data storage subsystem.

FIG. 4 illustrates in block diagram form additional details of cluster control 111. Multipath storage director 110 includes a plurality of channel interface units 201-0 to 201-7, each of which terminates a corresponding pair of data channels 21, 31. The control and data signals received by the corresponding channel interface unit 201-0 are output on either of the corresponding control and data buses 206-C, 206-D, or 207-C, 207-D, respectively, to either storage path 200-0 or storage path 200-1. Thus, as can be seen from the structure of the cluster control 111 illustrated in FIG. 2, there is a significant amount of symmetry contained therein. Storage path 200-0 is identical to storage path 200-1 and only one of these is described herein. The multipath storage director 110 uses two sets of data and control busses 206-D, C and 207-D, C to interconnect each channel interface unit 201-0 to 201-7 with both storage path 200-0 and 200-1 so that the corresponding data channel 21 from the associated host processor 11 can be switched via either storage path 200-0 or 200-1 to the plurality of optical fiber backend channels 104. Within storage path 200-0 is contained a processor 204-0 that regulates the operation of storage path 200-0. In addition, an optical device interface 205-0 is provided to convert between the optical fiber signalling format of optical fiber backend channels 104 and the metallic conductors contained within storage path 200-0. Channel interface control 202-0 operates under control of processor 204-0 to control the flow of data to and from cache memory 113 and one of the channel interface units 201 that is presently active with storage path 200-0. The channel interface control 202-0 includes a cyclic redundancy check (CRC) generator/checker to generate and check the CRC bytes for the received data. The channel interface circuit 202-0 also includes a buffer that compensates for speed mismatch between the data transmission rate of the data channel 21 and the available data transfer capability of the cache memory 113. The data that is received by the channel interface control circuit 202-0 from a corresponding channel interface circuit 201 is forwarded to the cache memory 113 via channel data compression circuit 203-0. The channel data compression circuit 203-0 provides the necessary hardware and microcode to perform compression of the channel data for the control unit 101 on a data write from the host processor 11. It also performs the necessary decompression operation for control unit 101 on a data read operation by the host processor 11.

As can be seen from the architecture illustrated in FIG. 4, all data transfers between a host processor 11 and a redundancy group in the disk drive subsets 103 are routed through cache memory 113. Control of cache memory 113 is provided in control unit 101 by processor 204-0. The functions provided by processor 204-0 include initialization of the cache directory and other cache data structures, cache directory searching and management, cache space management, cache performance improvement algorithms as well as other cache control functions. In addition, processor 204-0 creates the redundancy groups from the disk drives in disk drive subsets 103 and maintains records of the status of those devices. Processor 204-0 also causes the redundancy data across the N data disks in a redundancy group to be generated within cache memory 113 and writes the M segments of redundancy data onto the M redundancy disks in the redundancy group. The functional software in processor 204-0 also manages the mappings from virtual to logical and from logical to physical devices. The tables that describe this mapping are updated, maintained, backed up and occasionally recovered by this functional software on processor 204-0. The free space collection function is also performed by processor 204-0 as well as management and scheduling of the optical fiber backend channels 104. Many of these above functions are well known in the data processing art and are not described in any detail herein.

Dynamic Virtual Device to Logical Device Mapping

With respect to data transfer operations, all data transfers go through cache memory 113. Therefore, front end or channel transfer operations are completely independent of backend or device transfer operations. In this system, staging operations are similar to staging in other cached disk subsystems but destaging transfers are collected into groups for bulk transfers. In addition, this data storage subsystem 100 simultaneously performs free space collection, mapping table backup, and error recovery as background processes. Because of the complete front end/backend separation, the data storage subsystem 100 is liberated from the exacting processor timing dependencies of previous count key data disk subsystems. The subsystem is free to dedicate its processing resources to increasing performance through more intelligent scheduling and data transfer control.

The disk drive array data storage subsystem 100 consists of three abstract layers: virtual, logical and physical. The virtual layer functions as a conventional large form factor disk drive memory. The logical layer functions as an array of storage units that are grouped into a plurality of redundancy groups (ex 122-1 to 122-n+m), each containing N+M disk drives to store N physical tracks of data and M physical tracks of redundancy information for each logical track. The physical layer functions as a plurality of individual small form factor disk drives. The data storage management system operates to effectuate the mapping of data among these abstract layers and to control the allocation and management of the actual space on the physical devices. These data storage management functions are performed in a manner that renders the operation of the disk drive array data storage subsystem 100 transparent to the host processors (11-12).

A redundancy group consists of N+M disk drives. The redundancy group is also called a logical volume or a logical device. Within each logical device there are a plurality of logical tracks, each of which is the set of all physical tracks in the redundancy group which have the same physical track address. These logical tracks are also organized into logical cylinders, each of which is the collection of all logical tracks within a redundancy group which can be accessed at a common logical actuator position. A disk drive array data storage subsystem 100 appears to the host processor to be a collection of large form factor disk drives, each of which contains a predetermined number of tracks of a predetermined size called a virtual track. Therefore, when the host processor 11 transmits data over the data channel 21 to the data storage subsystem 100, the data is transmitted in the form of the individual records of a virtual track. In order to render the operation of the disk drive array data storage subsystem 100 transparent to the host processor 11, the received data is stored on the actual physical disk drives (122-1 to 122-n+m) in the form of virtual track instances which reflect the capacity of a track on the large form factor disk drive that is emulated by data storage subsystem 100. Although a virtual track instance may spill over from one physical track to the next physical track, a virtual track instance is not permitted to spill over from one logical cylinder to another. This is done in order to simplify the management of the memory space.

When a virtual track is modified by the host processor 11, the updated instance of the virtual track is not rewritten in data storage subsystem 100 at its original location but is instead written to a new logical cylinder and the previous instance of the virtual track is marked obsolete. Therefore, over time a logical cylinder becomes riddled with "holes" of obsolete data known as free space. In order to create whole free logical cylinders, virtual track instances that are still valid and located among fragmented free space within a logical cylinder are relocated within the disk drive array data storage subsystem 100 in order to create entirely free logical cylinders. In order to evenly distribute data transfer activity, the tracks of each virtual device are scattered as uniformly as possible among the logical devices in the parallel disk drive array data storage subsystem 100. In addition, virtual track instances are padded out if necessary to fit into an integral number of physical device sectors. This is to insure that each virtual track instance starts on a sector boundary of the physical device.

Mapping Tables

It is necessary to accurately record the location of all data within the disk drive array data storage subsystem 100 since the data received from the host processors 11-12 is mapped from its address in the virtual space to a physical location in the subsystem in a dynamic fashion. A virtual track directory is maintained to recall the location of the current instance of each virtual track in the disk drive array data storage subsystem 100. The virtual track directory consists of an entry for each virtual track which the associated host processor 11 can address. The entry contains the logical sector address at which the virtual track instance begins. The virtual track directory entry also contains data indicative of the length of the virtual track instance in sectors. The virtual track directory is stored in noncontiguous pieces of the cache memory 113 and is addressed indirectly through pointers in a virtual device table. The virtual track directory is updated whenever a new virtual track instance is written to the disk drives.

Figure 5:
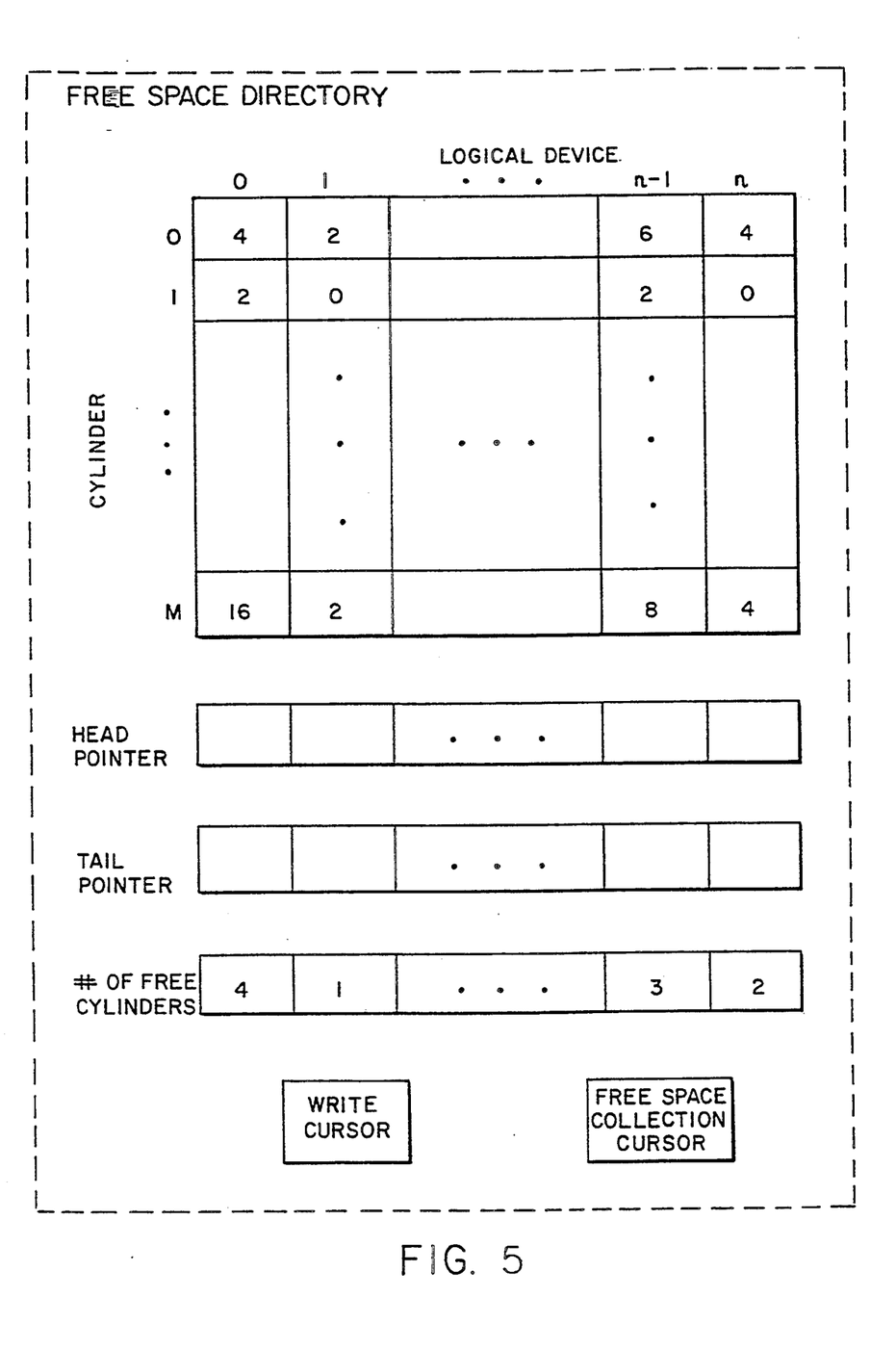
FIG. 5 illustrates the form and content of the free space directory.

The storage control also includes a free space directory (FIG. 5) which is a list of all of the logical cylinders in the disk drive array data storage subsystem 100 ordered by logical device. Each logical device is cataloged in a list called a free space list for the logical device; each list entry represents a logical cylinder and indicates the amount of free space that this logical cylinder presently contains. This free space directory contains a positional entry for each logical cylinder; each entry includes both forward and backward pointers for the doubly linked free space list for its logical device and the number of free sectors contained in the logical cylinder. Each of these pointers points either to another entry in the free space list for its logical device or is null. The collection of free space is a background process that is implemented in the disk drive array data storage subsystem 100. The free space collection process makes use of the logical cylinder directory which is a list contained in the first sector of each logical cylinder indicative of the contents of that logical cylinder. The logical cylinder directory contains an entry for each virtual track instance contained within the logical cylinder. The entry for each virtual track instance contains the identifier of the virtual track instance and the identifier of the relative sector within the logical cylinder in which the virtual track instance begins. From this directory and the virtual track directory, the free space collection process can determine which virtual track instances are still current in this logical cylinder and therefore need to be moved to another location to make the logical cylinder available for writing new data.

Data Move/Copy Operation

The data file move/copy operation instantaneously relocates or creates a second instance of a selected data file by merely generating a new set of pointers to reference the same physical memory location as the original set of reference pointers in the virtual track directory. In this fashion, by simply generating a new set of pointers referencing the same physical memory space, the data file can be moved/copied.

This apparatus instantaneously moves the original data file without the time penalty of having to download the data file to the cache memory 113 and write the data file to a new physical memory location. For the purpose of enabling a program to simply access the data file at a different virtual address the use of this mechanism provides a significant time advantage. A physical copy of the original data record can later be written as a background process to a second memory location, if so desired. Alternatively, when one of the programs that can access the data file writes data to or modifies the data file in any way, the modified copy of a portion of the original data file is written to a new physical memory location and the corresponding address pointers are changed to reflect the new location of this rewritten portion of the data file. In this fashion, a data file can be instantaneously moved/copied by simply creating a new set of memory pointers and the actual physical copying of the data file can take place either as a background process or incrementally as necessary when each virtual track of the data file is modified by one of the programs that accesses the data file.

Memory Pointers

Control unit 101 stores a plurality of pointers in the mapping tables, each of which identifies the exact physical location of an identified data record. For each data record stored in a disk drive unit 122-1 in disk drive subset 103-0, there is a corresponding pointer stored in the mapping tables of control unit 101 that identifies the physical memory location that contains this data record. This is illustrated schematically on FIG. 2 wherein elements 200-0 to 200-n are pointers that are stored in the mapping tables of control unit 101. Elements 211, 212 represents physical memory locations on rotating media 122-1 while 213, 214 and 215 represent physical memory locations on rotating media 122-2. Only two of the rotating media are shown for the purpose of illustration and memory space 211-215 on these rotating media are illustrated schematically. As can be seen from FIG. 2, pointer 200-1 contains data that is indicative of the physical location of data record 1. This data points to physical memory location 212 on rotating media 122-1. Thus, when the processor 100 requests access to data record 1, control unit 101 scans the table of pointers to locate the entry corresponding to data record 1. This entry is addressed by control unit 101 and the data contained therein read out to obtain the identification of the physical memory location that contains data record 1. In this case, the pointer entry indicates that data record 1 is located on rotating media 122-1 in the physical memory space designated on FIG. 2 as 212.

Figure 2:
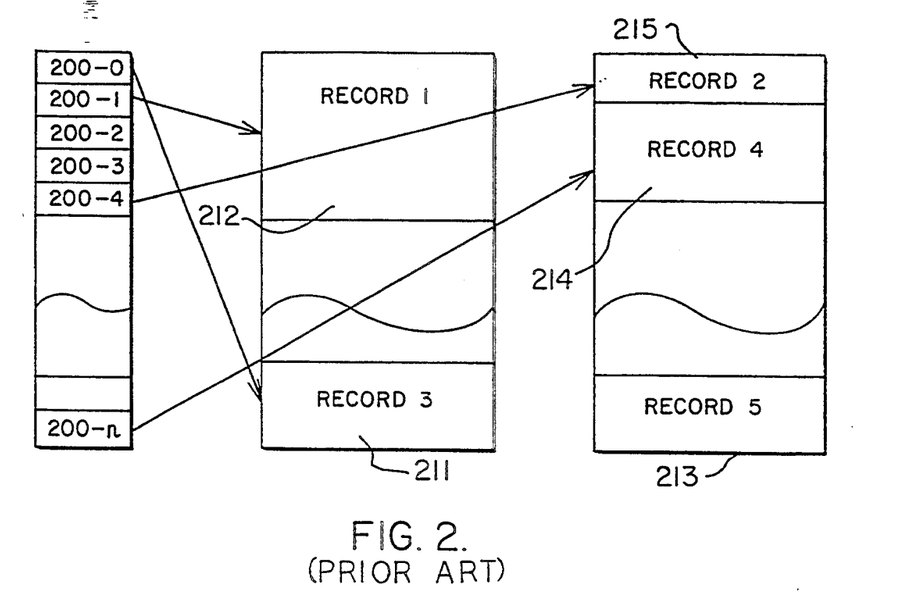
FIG. 2 illustrates in schematic form a typical virtual memory arrangement.

Similarly, pointer 200-4 contains the pointer entries for data record 2. The data stored in pointer location 200-4 indicates that data record 2 is stored on rotating media 122-2 in physical memory location 215.

Instant Copy Operation

The data record copy apparatus of the present invention can perform a "instant copy" operation wherein a copy of a particular data record is produced in a significantly less time than in prior systems. This apparatus takes advantage of the fact that the disk drive subset 103-0 accessed by processor 100 is a virtual memory system in that the data record Record 4 resides at a physical memory location 214 that differs from its memory address 200-n. In particular, the processor 100 addresses a data record Record 4 according to a particular address 200-n, which address is translated by the disk drive system into an actual physical memory location that does not correspond to the address used by processor 100. Control unit 101 maintains the information in the mapping tables that indicates the correspondence between each particular pointer data record memory address 200-n and the actual physical memory location 214 that contains the data record Record 4.

Figure 3:
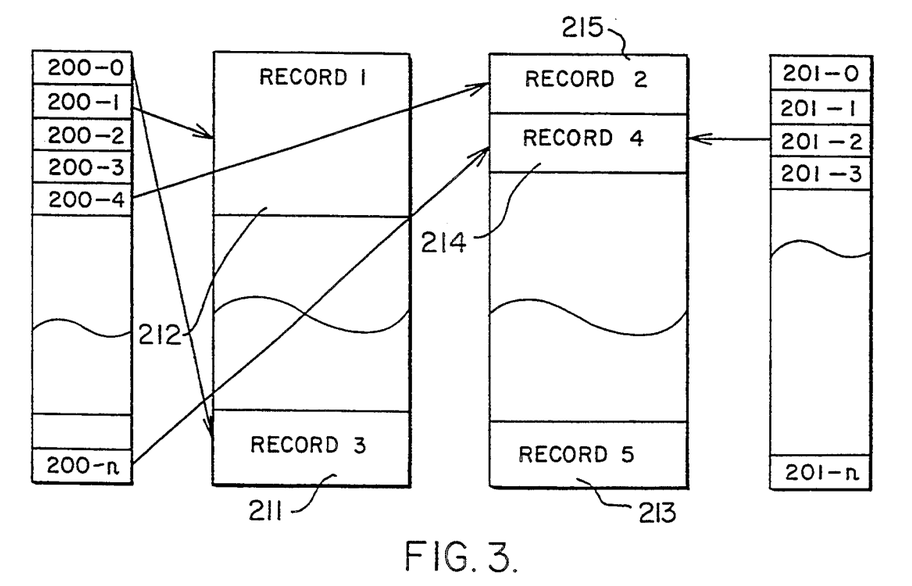
FIG. 3 illustrates in schematic diagram form the virtual memory arrangement of the present invention.

The data record copy performance improvement is accomplished by control unit 101 generating a new pointer 201-2, the contents of which point to the memory location 214 of the original data record Record 4. Thus, upon the conclusion of this data record copy operation, there is a single physical memory location 214 that contains the data record Record 4 and two pointers 200-n, 201-2, both of which point to that same physical memory location 214 that contains the data record Record 4. Since this is a virtual memory system, the two pointers 200-n, 201-2 represent two separate data records even though there is only a single physical memory location 214 that contains the data record Record 4. Thus, instead of making a copy of the physical data record 214 itself, a second pointer 201-2 is simply generated to point to the same data record Record 4. This operation makes two copies of the data record Record 4 available to the software resident on processor 100 without suffering the time penalty of having to actually read the data record Record 4 from the physical memory location 214 and then write a new copy of the data record Record 4 to a separate physical memory location (ex 213).

Control unit 101 can, as a background process, make another physical copy of the data record Record 4 if so desired. Alternatively, a more efficient method of managing the shared data record Record 4 is to wait until one of the programs on processor 100 modifies the data record Record 4. At this point, the modified data record (ex-Record 5) can be written to disk drive subset 103-0 to a new physical memory location 213. The corresponding pointer 201-2 is adjusted to indicate this new physical memory location 213 for the data record Record 5. In this fashion, another physical copy 213 of the data record Record 5 is produced only when changes are made to the original data record Record 4 and there no longer is a shared data record that has identical contents. This eliminates duplicate data records as is commonly found in prior art systems.

Virtual Track Directory Source and Target Flags

Each entry in the Virtual Track Directory (VTD) contains two flags associated with the Copy/Move function. The "Source" flag is set whenever a Virtual Track Instance at this Virtual Track Address has been the origin of a copy or move. The Virtual Track Instance pointed to by this entry is not necessarily the Source, but the Virtual Track Instance contains this Virtual Address. If the Source flag is set, there is at least one entry in the Copy Table for this Virtual Address. The "Target" flag is set whenever a Virtual Track Instance contains data that has been the destination of a copy or move. If the Target flag is set, the Virtual Address in the Virtual Track Instance that is pointed to is not that of the VTD Entry.

Copy Table

The format of the Copy Table is illustrated here graphically. The preferred implementation is to have a separate Copy Table for each Logical Device so that there is a Copy Table head and tail pointer associated with each Logical Device; however, the table could just as easily be implemented as a single table for the entire subsystem. The table is ordered such that the sources are in ascending Logical Address order.

The table is a singly linked list of Sources where each Source is the head of a linked list of Targets.
The Source Entry contains the following:
    Logical Address (VTD Entry Copy)
    Virtual Address
    Next Source Pointer (NULL if last Source in list)
    Target Pointer
The Target Entry contains the following:
    Virtual Address
    Next Target Pointer (NULL if last Target in list)
    Update Count Fields Flag

Data Read Operation

Figure 6:
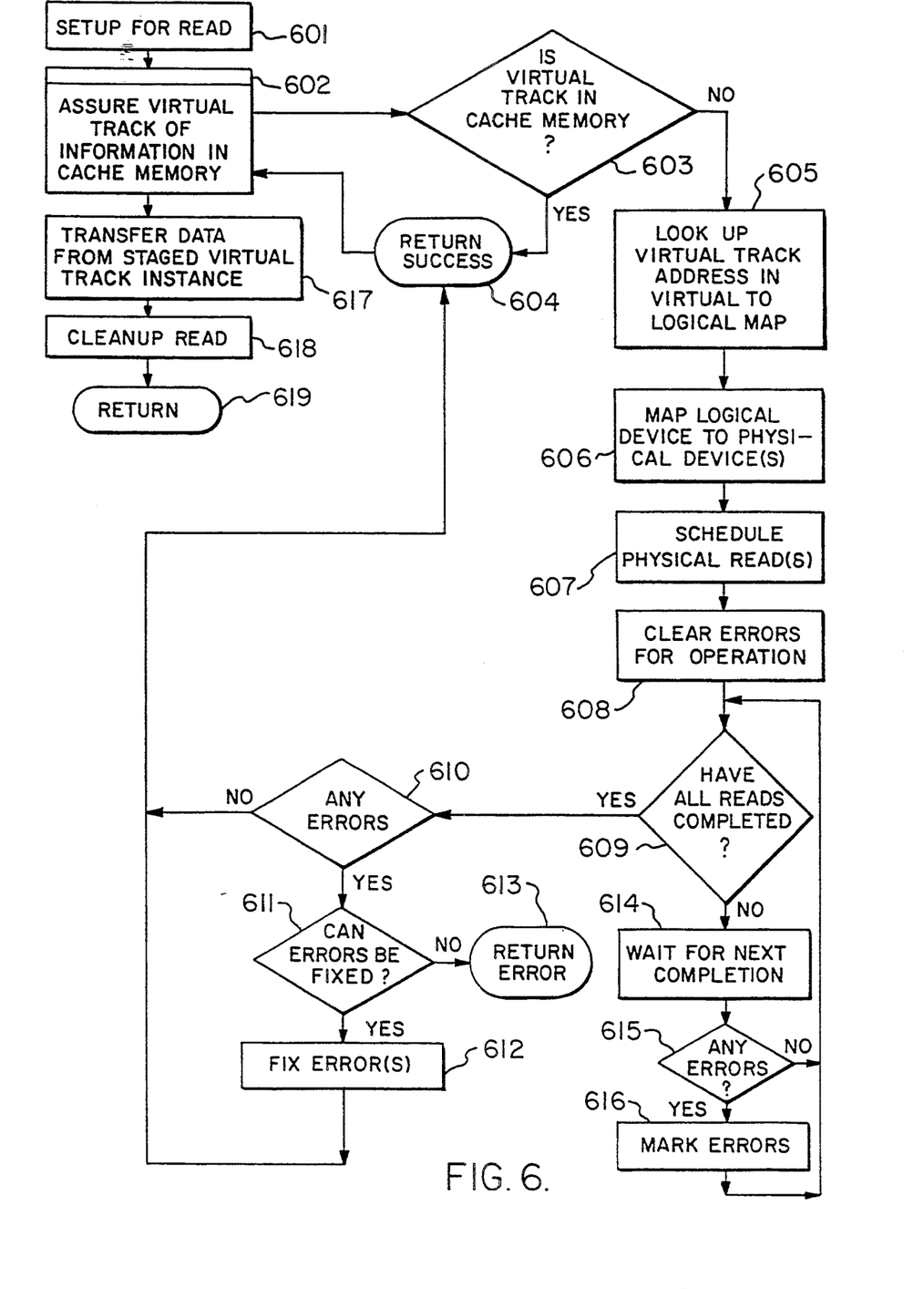
FIG. 6 illustrates in flow diagram form the steps taken by the data storage subsystem to read data.

FIG. 6 illustrates in flow diagram form the operational steps taken by processor 204 in control unit 101 of the data storage subsystem 100 to read data from a data redundancy group 122-1 to 122-n+m in the disk drive subsets 103. The disk drive array data storage subsystem 100 supports reads of any size. However, the logical layer only supports reads of virtual track instances. In order to perform a read operation, the virtual track instance that contains the data to be read is staged from the logical layer into the cache memory 113. The data record is then transferred from the cache memory 113 and any clean up is performed to complete the read operation.

At step 601, the control unit 101 prepares to read a data record from a virtual track. At step 602, the control unit 101 branches to the cache directory search subroutine to determine whether the virtual track is located in the cache memory 113 since the virtual track may already have been staged into the cache memory 113 and stored therein in addition to having a copy stored on the plurality of disk drives (122-1 to 122-n+m) that constitute the redundancy group in which the virtual track is stored. At step 603, the control unit 101 scans the hash table directory of the cache memory 113 to determine whether the requested virtual track is located in the cache memory 113. If it is, at step 604 control returns back to the main read operation routine and the cache staging subroutine that constitutes steps 605-616 is terminated.

Assume, for the purpose of this description, that the virtual track that has been requested is not located in the cache memory 113. Processing proceeds to step 605 where the control unit 101 looks up the address of the virtual track in the virtual to logical map table. At step 606, the logical map location is used to map the logical device to one or more physical devices in the redundancy group. At step 607, the control unit 101 schedules one or more physical read operations to retrieve the virtual track instance from appropriate ones of identified physical devices 122-1 to 122-n+m. At step 608, the control unit 101 clears errors for these operations. At step 609, a determination is made whether all the reads have been completed, since the requested virtual track instance may be stored on more than one of the N+M disk drives in a redundancy group. If all of the reads have not been completed, processing proceeds to step 614 where the control unit 101 waits for the next completion of a read operation by one of the N+M disk drives in the redundancy group. At step 615 the next reading disk drive has completed its operation and a determination is made whether there are any errors in the read operation that has just been completed. If there are errors, at step 616 the errors are marked and control proceeds back to the beginning of step 609 where a determination is made whether all the reads have been completed. If at this point all the reads have been completed and all portions of the virtual track instance have been retrieved from the redundancy group, then processing proceeds to step 610 where a determination is made whether there are any errors in the reads that have been completed. If errors are detected then at step 611 a determination is made whether the errors can be fixed. One error correction method is the use of a Reed-Solomon error detection/correction code to recreate the data that cannot be read directly. If the errors cannot be repaired then a flag is set to indicate to the control unit 101 that the virtual track instance can not be read accurately. If the errors can be fixed, then in step 612 the identified errors are corrected and processing returns back to the main routine at step 604 where a successful read of the virtual track instance from the redundancy group to the cache memory 113 has been completed.

At step 617, control unit 101 transfers the requested data record from the staged virtual track instance in which it is presently stored. Once the records of interest from the staged virtual track have been transferred to the host processor 11 that requested this information, then at step 618 the control unit 101 cleans up the read operation by performing the administrative tasks necessary to place all of the apparatus required to stage the virtual track instance from the redundancy group to the cache memory 113 into an idle state and control returns at step 619 to service the next operation that is requested.

Data Write Operation

Figure 7:
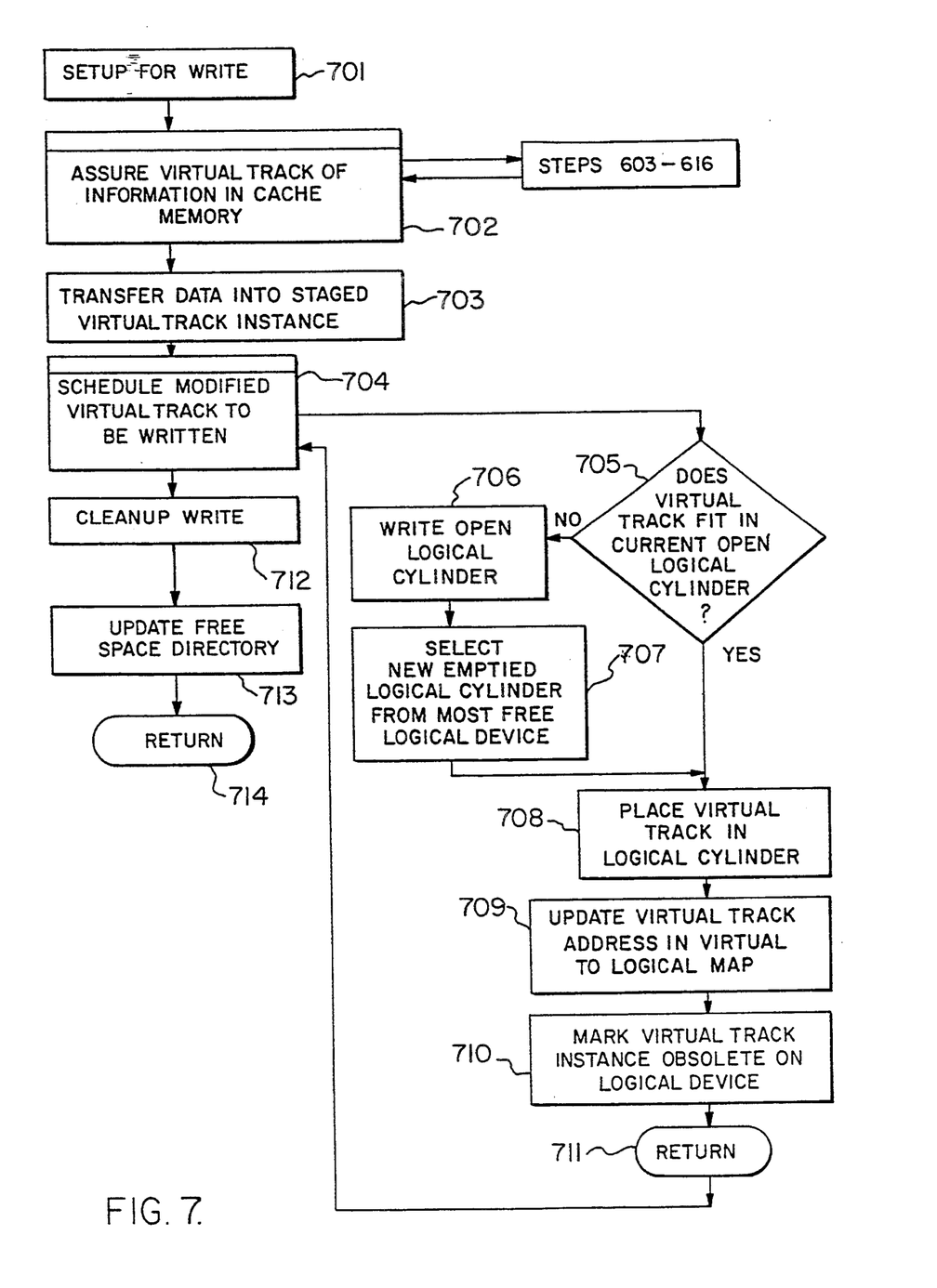
FIG. 7 illustrates in flow diagram form the steps taken by the data storage subsystem to write data.

FIG. 7 illustrates in flow diagram form the operational steps taken by the disk drive array data storage subsystem 100 to perform a data write operation. The disk drive array data storage subsystem 100 supports writes of any size, but again, the logical layer only supports writes of virtual track instances. Therefore in order to perform a write operation, the virtual track that contains the data record to be rewritten is staged from the logical layer into the cache memory 113. Once the write operation is complete, the location of the obsolete instance of the virtual track is marked as free space. The modified data record is then transferred into the virtual track and this updated virtual track instance is then scheduled to be written from the cache memory 113 where the data record modification has taken place into the logical layer. Any clean up of the write operation is then performed once this transfer and write is completed.

At step 701, the control unit 101 performs the set up for a write operation and at step 702, as with the read operation described above, the control unit 101 branches to the cache directory search subroutine to assure that the virtual track into which the data is to be transferred is located in the cache memory 113. Since all of the data updating is performed in the cache memory 113, the virtual track in which this data is to be written must be transferred from the redundancy group in which it is stored to the cache memory 113 if it is not already resident in the cache memory 113. The transfer of the requested virtual track instance to the cache memory 113 is performed for a write operation as it is described above with respect to a data read operation and constitutes steps 603-616 illustrated in FIG. 6 above.

At step 703, the control unit 101 marks the virtual track instance that is stored in the redundancy group as invalid in order to assure that the logical location at which this virtual track instance is stored is not accessed in response to another host processor 12 attempting to read or write the same virtual track. Since the modified record data is to be written into this virtual track in the cache memory 113, the copy of the virtual track that resides in the redundancy group is now inaccurate and must be removed from access by the host processors 11-12. At step 704, the control unit 101 transfers the modified record data received from host processor 11 into the virtual track that has been retrieved from the redundancy group into the cache memory 113 to thereby merge this modified record data into the original virtual track instance that was retrieved from the redundancy group. Once this merge has been completed and the virtual track now is updated with the modified record data received from host processor 11, the control unit 101 must schedule this updated virtual track instance to be written onto a redundancy group somewhere in the parallel disk drive array data storage subsystem 100.

This scheduling is accomplished by the subroutine that consists of steps 706–711. At step 706, the control unit 101 determines whether the virtual track instance as updated fits into an available open logical cylinder. If it does not fit into an available open logical cylinder, then at step 707 this presently open logical cylinder must be closed out and written to the physical layer and another logical cylinder selected from the most free logical device or redundancy group in the disk drive array data storage subsystem 100. At step 708, the selection of a free logical cylinder from the most free logical device takes place. This ensures that the data files received from host processor 11 are distributed across the plurality of redundancy groups in the disk drive array data storage subsystem 100 in an even manner to avoid overloading certain redundancy groups while underloading other redundancy groups. Once a free logical cylinder is available, either being the presently open logical cylinder or a newly selected logical cylinder, then at step 709, the control unit 101 writes the updated virtual track instance into the logical cylinder and at step 710 the new location of the virtual track is placed in the virtual to logical map in order to render it available to the host processors 11–12. At step 711, control returns to the main routine, where at step 712 the control unit 101 cleans up the remaining administrative tasks to complete the write operation and return to an available state at 712 for further read or write operations from host processor 11.

Cache Consistency

In the case where the original data record is staged or a copy thereof is stored in cache memory 113, an additional level of data consistency is required. The data record is staged into cache memory 113 from disk drive subset 103-1 in response to host processor 11 addressing the data record using one of the virtual addresses (pointers) stored in the copy table and used to access a single shared data record (as described above). If host processor 11 modifies the data record as staged into cache memory 113, the modified data record in cache memory 113 is now not consistent with the original data record in disk drive subset 103-1.

To remedy this potential data inconsistency, all of the virtual addresses stored in the mapping tables and associated with the original data record are made available when the original data record is loaded into cache memory 113. These virtual addresses are, for example, all loaded into the hash table of cache memory 113. In addition, a Copy On Write bit is associated with each address pointer for the data record associated with the copy table. When any one of these virtual addresses are accessed for a data record write operation, the cache memory 113 notes the data record copy status of this data record by reviewing the state of the copy on write bit. In order to preserve the integrity of the original data record, as addressed by the remaining copy table virtual addresses associated with the original data record the data record whose copy on write bit is set is copied in cache memory 113 to another physical memory location therein. The virtual address, used by host processor 11 to address the original data record in the data record write operation, is assigned to this new copy of the data record. This virtual address is expunged from the copy table.

The data record copy operation in cache memory 113 is faster than a copy operation in disk drive subset 103-1. In addition, the cache consistency problem arises in only a small fraction of the data record copy operations and has minimal impact on the performance thereon due to the above-described cache data record consistency apparatus.

While a specific embodiment of this invention has been disclosed, it is expected that those skilled in the art can and will design alternate embodiments of this invention that fall within the scope of the appended claims.

I claim:

1. In a virtual memory data storage subsystem that contains a plurality of data storage elements connected to a host processor through a cache memory for storing a plurality of data records therein and a number of data record pointers stored in a mapping table, each data record pointer identifying a physical memory location in said data storage elements containing an associated data record, a method of maintaining data integrity for a first data record stored in a one of said physical memory locations which is addressable by said processor via a plurality of data record pointers, comprising the steps of:

determining, in response to receipt of a data record write request from said processor which identifies said first data record by a first data record pointer, whether said requested first data record resides in said cache memory;

determining, in response to said requested first data record residing in said cache memory, whether said requested first data record is identified by more than said first data record pointer;

creating, in response to said requested first data record being identified by more than said first data record pointer, a second data record in said cache memory which second data record is a copy of said requested first data record in said cache memory; and assigning said first data record pointer to said second data record.

2. The method of claim 1 further comprising the steps of:

staging, in response to determining that said requested first data record does not reside in said cache memory, said requested first data record from said one physical memory location on said data storage elements identified by said first data record pointer to said cache memory;

transferring said plurality of data record pointers, which correspond to said one physical memory location, from said mapping table to said cache memory.

3. The method of claim 2 wherein said step of transferring comprises:

reviewing the state of a copy flag bit in said mapping table associated with said first data record pointer to determine whether said one physical memory location has associated therewith more than said first data record pointer.

4. In a virtual memory data storage subsystem that contains a plurality of data storage elements connected to a host processor through a cache memory for storing a plurality of data records therein and a number of data record pointers stored in a mapping table, each data record pointer identifying a physical memory location in said data storage elements containing an associated data record, apparatus for maintaining data integrity for a first data record stored in one of said physical memory locations which is addressable by said processor via a plurality of said data record pointers, comprising:

- means for determining, in response to receipt of a data record write request from said processor which identifies said first data record by said first data record pointer, whether said requested first data record resides in said cache memory;
- means for determining, in response to said requested first data record residing in said cache memory, whether said requested first data record is identified by more than said first data record pointer;
- means for creating, in response to said requested first data record being identified by more than said first data record pointer, a second data record in said cache memory which is a copy of said requested first data record in said cache memory; and
- means for assigning said first data record pointer to said second data record.

5. The apparatus of claim 4 further comprising:

- means for staging, in response to determining that said requested first data record does not reside in said cache memory, said requested first data record from said one physical memory location on said data storage elements identified by said first data record pointer to said cache memory;
- means for transferring said plurality of data record pointers, which correspond to said one physical memory location, from said mapping table to said cache memory.

6. The apparatus of claim 4 further comprising:

- means for reviewing the state of a copy flag bit in said mapping table associated with said first data record pointer to determine whether said one physical memory location has associated therewith more than said first data record pointer.

7. In a virtual memory data storage subsystem that contains a plurality of data storage elements connected to a host processor through a cache memory for storing a plurality of data records therein and a number of data record pointers stored in a mapping table, each data record pointer identifying a physical memory location in said data storage elements containing an associated data record, a method of maintaining data integrity for a first data record stored in one of said physical memory locations which is addressable by said processor via a plurality of said data record pointers, comprising the steps of:

- determining, in response to receipt of a data record write request from said processor which identifies said first data record by said first data record pointer, whether said requested first data record resides in said cache memory;
- determining, in response to said requested first data record residing in said cache memory, whether said requested first data record is identified by more than said first data record pointer;
- staging, in response to determining that said requested first data record does not reside in said cache memory, said requested first data record from said one physical memory location on said data storage elements identified by said first data record pointer to said cache memory;
- transferring said plurality of data record pointers, which correspond to said one physical memory location, from said mapping table to said cache memory;
- reviewing the state of a copy flag bit in said mapping table associated with said first data record pointer to determine whether said one physical memory location has associated therewith more than said first data record pointer;
- creating, in response to said requested first data record being identified by more than said first data record pointer, a second data record in said cache memory which is a copy of said requested first data record in said cache memory; and
- assigning said first data record pointer to said second data record.

8. In a virtual memory data storage subsystem that contains a plurality of data storage elements connected to a host processor through a cache memory for storing a plurality of data records therein and a number of data record pointers stored in a mapping table, each data record pointer identifying a physical memory location in said data storage elements containing an associated data record, apparatus for maintaining data integrity for a first data record stored in one of said physical memory locations which is addressable by said processor via a plurality of said data record pointers, comprising:

- means for determining, in response to receipt of a data record write request from said processor which identifies said first data record by said first data record pointer, whether said requested first data record resides in said cache memory;
- means for determining, in response to said requested first data record residing in said cache memory, whether said requested first data record is identified by more than said first data record pointer;
- means for staging, in response to determining that said requested first data record does not reside in said cache memory, said requested first data record from said one physical memory location on said data storage elements identified by said first data record pointer to said cache memory;
- means for transferring said plurality of data record pointers, which correspond to said one physical memory location, from said mapping table to said cache memory;
- means for reviewing the state of a copy flag bit in said mapping table associated with said first data record pointer to determine whether said one physical memory location has associated therewith more than said first data record pointer;
- means for creating, in response to said requested first data record being identified by more than said first data record pointer, a second data record in said cache memory which is a copy of said requested first data record in said cache memory; and
- means for assigning said first data record pointer to said second data record.

* * * * *